US010101965B1

(12) United States Patent
Bhat et al.

(10) Patent No.: US 10,101,965 B1
(45) Date of Patent: Oct. 16, 2018

(54) METHOD AND APPARATUS FOR HIGH SPEED STREAMING SORTER

(71) Applicant: MBIT WIRELESS, INC., Newport Beach, CA (US)

(72) Inventors: Raghavendra H. Bhat, Bangalore (IN); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 427 days.

(21) Appl. No.: 14/925,006

(22) Filed: Oct. 28, 2015

(51) Int. Cl.
*G06F 17/30* (2006.01)
*G06F 17/00* (2006.01)
(Continued)

(52) U.S. Cl.
CPC .................. *G06F 7/24* (2013.01); *G06F 5/01* (2013.01); *G06F 2207/22* (2013.01)

(58) Field of Classification Search
CPC ... H04L 65/60; H04L 65/602; H04L 65/4069; H04L 67/18; H04L 47/724; H04L 51/20; H04L 65/4076; H04L 65/4084; H04L 65/4092; H04L 65/607; H04L 67/2838; H04L 67/306; H04L 47/15; H04L 51/24; H04L 65/80; H04L 67/303; H04L 67/32; H04L 12/1859; H04L 47/6255; H04L 47/826; H04L 49/00; H04L 49/25; H04L 51/00; H04L 51/32; H04L 51/38; H04L 67/12; H04L 12/1845; H04L 1/0047; H04L 1/0052; H04L 1/0054; H04L 1/006; H04L 1/20; H04L 2025/03796; H04L 25/03203;
(Continued)

(56) References Cited

U.S. PATENT DOCUMENTS 7,756,085 B2 * 7/2010 Terasawa ........... H04B 1/70735
370/335
8,335,782 B2 * 12/2012 Nishizawa .......... G06F 17/3053
707/718
(Continued)

OTHER PUBLICATIONS

Batcher, K.E. "Sorting Networks and Their Applications," Proceedings of AFIPS Spring Joint Computing Conference, (1968) vol. 32, pp. 307-314.

*Primary Examiner* — Yicun Wu
(74) *Attorney, Agent, or Firm* — Lerner, David, Littenberg, Krumholz & Mentlik, LLP

(57) ABSTRACT

Sorting algorithms are generally used at different steps in data processing. In many situations, the efficiency of the sorting algorithm used determines the throughput/execution speed of the application. Methods for implementing high speed sorting in hardware are often based on Batcher's Odd/Even sort or Bitonic sort algorithms. These algorithms are computation intensive and involve high number of logic gates to implement and high power consumption. The higher the number of logic gates, the more silicon area may be required and may lead to higher cost. Insertion sort is a sorting algorithm that is relatively simpler and may require fewer logic gates to implement. However, throughput achieved using Insertion sort algorithm is much lower than the throughput achieved using high speed sorting algorithms. A method and apparatus enable an efficient hardware design capable of simultaneously sorting multiple data inputs for high throughput at reduced complexity.

20 Claims, 10 Drawing Sheets

(51) Int. Cl.
*G06F 7/24* (2006.01)
*G06F 5/01* (2006.01)

(58) Field of Classification Search
CPC ......... H04L 25/03235; H04L 25/03305; H04L 25/03331; H04L 29/08135; H04L 29/08549; H04L 41/0806; H04L 41/14; H04L 41/22; H04L 41/5054; H04L 43/026; H04L 43/04; H04L 43/08; H04L 43/0876; H04L 45/00; H04L 45/20; H04L 45/302; H04L 47/12; H04L 47/2441; H04L 47/25; H04L 47/56; H04L 47/624; H04L 47/6295; H04L 47/801; H04L 49/90; H04L 63/0407; H04L 63/0428; H04L 63/08; H04L 63/0876; H04L 63/10; H04L 63/30; H04L 63/306; H04L 65/4015; H04L 65/604
See application file for complete search history.

(56) References Cited

U.S. PATENT DOCUMENTS

| | | | |
|---|---|---|---|
| 9,298,419 B2 * | 3/2016 | Inoue | G06F 9/30021 |
| 2015/0046453 A1 * | 2/2015 | Asaad | G06F 17/3053 |
| | | | 707/737 |
| 2015/0046478 A1 * | 2/2015 | Asaad | G06F 17/30327 |
| | | | 707/753 |
| 2016/0188644 A1 * | 6/2016 | Sukhwani | G06F 7/24 |
| | | | 707/753 |

* cited by examiner

FIG. 10

| Scenario # | Number of shifts applied till HSU(k-1) | Data insertion in HSU(k-1) | Number of shifts applied till HSU(k) | Data insertion in HSU(k) | Next R4 | Next R3 | Next R2 | Next R1 |
|---|---|---|---|---|---|---|---|---|
| 1 | 0 | 0 | 0 | 0 | CRV4 | CRV3 | CRV2 | CRV1 |
| 2 | 0 | 0 | 0 | 1 | CSA1 | CSA2 | CSA3 | CSA4 |
| 3 | 0 | 1 | 1 | 0 | PSA5 | CRV4 | CRV3 | CRV2 |
| 4 | 0 | 1 | 1 | 1 | PSA5 | CSA1 | CSA2 | CSA3 |
| 5 | 0 | 1 | 2 | 0 | PSA5 | PSA6 | CRV4 | CRV3 |
| 6 | 0 | 1 | 2 | 1 | PSA5 | PSA6 | CSA1 | CSA2 |
| 7 | 0 | 1 | 3 | 0 | PSA5 | PSA6 | PSA7 | CRV4 |
| 8 | 0 | 1 | 3 | 1 | PSA5 | PSA6 | PSA7 | CSA1 |
| 9 | 0 | 1 | 4 | 0 | PSA5 | PSA6 | PSA7 | PSA8 |
| 10 | 1 | 0 | 1 | 0 | PRV1 | CRV4 | CRV3 | CRV2 |
| 11 | 1 | 0 | 1 | 1 | PRV1 | CSA1 | CSA2 | CRS3 |
| 12 | 1 | 1 | 2 | 0 | PSA4 | PSA5 | CRV4 | CRV3 |
| 13 | 1 | 1 | 2 | 1 | PSA4 | PSA5 | CSA1 | CSA2 |
| 14 | 1 | 1 | 3 | 0 | PSA4 | PSA5 | PSA6 | CRV4 |
| 15 | 1 | 1 | 3 | 1 | PSA4 | PSA5 | PSA6 | CSA1 |
| 16 | 1 | 1 | 4 | 0 | PSA4 | PSA5 | PSA6 | PSA7 |
| 17 | 2 | 0 | 2 | 0 | PRV2 | PRV1 | CRV4 | CRV3 |
| 18 | 2 | 0 | 2 | 1 | PRV2 | PRV1 | CSA1 | CSA2 |
| 19 | 2 | 1 | 3 | 0 | PSA3 | PSA4 | PSA5 | CRV4 |
| 20 | 2 | 1 | 3 | 1 | PSA3 | PSA4 | PSA5 | CSA1 |
| 21 | 2 | 1 | 4 | 0 | PSA3 | PSA4 | PSA5 | PSA6 |
| 22 | 3 | 0 | 3 | 0 | PRV3 | PRV2 | PRV1 | CRV4 |
| 23 | 3 | 0 | 3 | 1 | PRV3 | PRV2 | PRV1 | CSA1 |
| 24 | 3 | 1 | 4 | 0 | PSA2 | PSA3 | PSA4 | PSA5 |
| 25 | 4 | 0 | 4 | 0 | PRV4 | PRV3 | PRV2 | PRV1 |

METHOD AND APPARATUS FOR HIGH SPEED STREAMING SORTER

BACKGROUND

Sorting algorithms may be used at different stages in many data processing systems. In many applications, the efficiency of the sorting algorithm used determines the throughput and the execution speed of the data processing systems. Methods and algorithms for implementing high speed sorting in hardware are often based on Batcher's Odd/Even sort algorithm or Bitonic sort algorithm as described in "Sorting Networks and their Applications," K. E. Batcher, Proceedings of AFIPS Spring Joint Computing Conference, Vol. 32, 307-314, 1968.

Some sorting algorithms such as Quicksort and Heapsort that are efficient for software implementation are not suitable for hardware implementation because they have high algorithmic complexity and the execution may be limited to a single comparison operation at a time. Simpler sorting algorithms, which utilize the parallelism available in hardware implementation, perform better than these complex algorithms in hardware implementations.

The Batcher's Odd/Even sort algorithm is based on Merge sort and is data independent, i.e., the same comparisons are performed regardless of actual data. Merge sorting may be normally done by sorting its two halves and then merging the two sorted halves. In case of sorting N elements, Batcher's algorithm has a complexity of the order of N×(log N)$^2$ and latency of (log N)$^2$ because of the logic depth. Logic depth in a digital circuit is the maximum number of basic gates (AND, OR, INV, etc.) a signal needs to travel from source flip-flop to destination flip-flop.

FIG. 1 shows the application of Batcher's Odd/Even sorting algorithm for sorting four elements. In-place sorting may be easily performed using comparators and multiplexers.

There are other sorting algorithms based on Merge sort, such as Bitonic sorting and Shell sorting algorithms that have similar complexity of N×(log N)$^2$ for sorting N elements. However, Batcher's Odd/Even merge sorting algorithm requires the fewest comparators when compared to Bitonic sorting algorithm and Shell sorting algorithm.

The complexity of Batcher's Odd/Even sorting algorithm increases rapidly with the number of elements to be sorted. For large values of N, excessive parallel comparisons may have to be performed. One of the methods to overcome this drawback is to group N values into disjoint sets of fewer elements and use resource-sharing techniques to reduce the complexity at the cost of throughput reduction. To operate at higher clock frequency, a pipelining technique may be used to reduce the critical path delay due to the logic depth. Registering intermediate results at each stage introduces latency. This method produces high throughput only when sorting independent N elements at each iteration. However pipelining may not be suitable for sorting progressive N inputs because each iteration result has to be merged with the previous sorted results. Pipelining delay may have a direct impact on the throughput.

The Insertion sorting method uses cascaded sorting units. A sorting unit comprises basic compare and swap units organized in such a way that input data is sorted as it streams through the pipeline. A single such sorting unit is shown in FIG. 2. Each sorting unit is connected to its two neighbors and to the new input element $R_{in}$. Let the data present in sorting unit X be denoted by $R_x$. Each unit retains the smaller of $R_x$ and $R_{in}$ and shifts the larger of the two to its neighbor sorting unit that follows it in the cascade. At the end of insertion of all N elements, the first unit from the last unit in the cascade has the minimum value. The expression $R_x < R_{x+1}$ is true at every time instance.

The structure is easily scalable and requires minimal control circuitry to control the data movement. For example, to select M most significant elements out of N elements, M basic Insertion sort units are cascaded as shown in FIG. 3. Prior to the insertion process, registers within each sorting unit are initialized to a maximum value that they can hold. Insertion of one element from the input data queue takes place at a time. Inserting an element into any of the registers is equivalent to selectively placing the new input element into the set of M most significant elements. After insertion, one of the elements out of previously selected M elements may be discarded. This process continues until all the N elements present in the input data queue are selectively inserted into the array of M sorting units. At the end, registers $R_1$ through $R_M$ hold the M most significant elements.

The above Insertion sort method is capable of selecting M most significant elements from the incoming elements. The total number of elements N may be finite or the input elements may be arriving continuously in a streaming manner. The method continuously selects the M most significant elements from all the input elements at any given time and therefore it is referred as streaming sorter. However, the above architecture is capable of inserting only one element at a time. This method takes N clock cycles to sort N input elements.

Each insertion operation involves comparison of $R_{in}$ with the elements present in each sorting unit, i.e., M comparisons. Note that as the Insertion process progresses, each element is inserted into an array that is already partially sorted. Hence, most of the comparison operations performed are redundant. At the end of N element insertion, a total of N*M comparisons may be performed.

Selecting M most significant elements out of N elements is a common problem faced in many data processing systems. In a case where N is a small quantity, Batcher's Odd/Even sorting algorithm may be used to obtain the desired performance. For large values of N, Insertion sort logic shown in FIG. 3 may have simpler hardware. However, it only accepts one input element at a time. In many applications, it is required to extract the M smallest or largest elements from a set of N elements. In general, the total number of elements N in a set may be infinite in theory or very large in practice. The number of smallest or largest elements M may be generally much smaller. A method and apparatus are disclosed that enable high throughput and lower complexity streaming sorter.

SUMMARY

In accordance with an aspect of the present invention, a method may sort N data elements into M most significant data elements in sorted order, wherein M<N. The method may include: controlling, by a processing device, inputting L data elements of the N data elements at a same time into at least one sorting unit of a cascade of S sorting units, in which the L input data elements is sorted only among the L input data elements before the inputting, in which the sorting units are arranged in the cascade in order of priority, in which each of the sorting units includes B registers for storing M/S data elements in sorted order and in order in relation to data elements respectively in the B registers of a neighbor sorting unit in the cascade, in which the S sorting units store a current set of most significant data elements of data elements previously input thus far, and in which S*B=M, B≥L and L≥1; controlling, by the processing device, for each sorting unit of the cascade, sorting (i) each comparison data element determined to be inserted in the sorting based on a comparison of each of the L input data elements with a most significant value of the B registers of the sorting unit and (ii) the data elements respectively of the B registers of the sorting unit, to obtain a sorted array of data elements in order of significance; and controlling, by the processing device, at a given sorting unit of the cascade, storing, into the B registers in sorted order, data elements determined from (i) when no shift data elements is output from a preceding neighbor sorting unit in the cascade, the B most significant values of the sorted array of data elements for the given sorting unit, and (ii) when SH shift data elements is output from the preceding neighbor sorting unit in the cascade, the SH shift data elements and a subset of the data elements of the sorted array in accordance with the value of SH, in which 1≤SH≤B, and outputting, as SHN shift-next data elements in order, SHN data elements from the sorted array of data elements more or less significant than the most or least significant data element of the sorted array stored in the B registers by the storing, in which 1≤SHN≤B.

In one alternative, when the SH shift data elements is output from the preceding neighbor sorting unit in the cascade, the SH shift data elements may be stored into the B registers of the given sorting unit in sequence starting from a least or most significant register of the B registers, and B-SH data elements from the sorted array, starting from the SH+1 data element of the sorted array, may be stored in the B registers in sequence starting from the register of the B registers neighboring the register of the B registers in which the least or most significant of the shift data elements is stored.

In one alternative, each of the S sorting units may include a load-shift control block and a value selector block as a part of the processing device, and be associated with an Internal Parallel Sorter (IPS) which is a part of the processing device, wherein, in each of the S sorting units, the load-shift control block controls the comparison of each of the L data elements with the most significant value of the B registers, when at least one comparison data element is determined from the comparison, the IPS generates the sorted array including each comparison data element determined from the comparison and the data elements of the B registers in the order of significance, and the value selector block selects B data elements for storing into the B registers in sorted order based on a number of data elements input into one or more sorting units of the cascade having one of higher and lower priority.

In one alternative, in the given sorting unit, the sorted array may be generated by the IPS using Batcher's Odd/Even sorting algorithm when L is less than a predetermined value.

In one alternative, in the given sorting unit when L is less than B, an input of the IPS that is unused may be set to a maximum value to be discarded when the value selector block is selecting B data elements for storing into the B registers.

In one alternative, in each of the S sorting units, each comparison data element determined based on the comparison may be less than a maximum value or greater than a minimum value of the B registers for the sorting unit.

In one alternative, in the given sorting unit, when the SH shift data elements is output from the preceding neighboring sorting unit, the subset of the data elements of the sorted array may not include the SH data elements of the sorted array starting in sequence from a first or last data element of the sorted array.

In one alternative, the inputting of the L input data elements may be into each sorting unit of the cascade at the same time.

In accordance with an aspect of the present invention, an apparatus may sort N data elements into M most significant data elements in sorted order, wherein M<N. The may include circuitry configured to control: inputting L data elements of the N data elements at a same time into at least one sorting unit of a cascade of S sorting units of the circuitry, in which the L input data elements is sorted only among the L input data elements before the inputting, in which the sorting units are arranged in the cascade in order of priority, in which each of the sorting units includes B registers for storing M/S data elements in sorted order and in order in relation to data elements respectively in the B registers of a neighbor sorting unit in the cascade, in which the S sorting units store a current set of most significant data elements of data elements previously input thus far, and in which S*B=M, B≥L and L≥1; for each sorting unit of the cascade, sorting (i) each comparison data element determined to be inserted in the sorting based on a comparison of each of the L input data elements with a most significant value of the B registers of the sorting unit and (ii) the data elements respectively of the B registers of the sorting unit, to obtain a sorted array of data elements in order of significance; and at a given sorting unit of the cascade, storing, into the B registers in sorted order, data elements determined from (i) when no shift data elements is output from a preceding neighbor sorting unit in the cascade, the B most significant values of the sorted array of data elements for the given sorting unit, and (ii) when SH shift data elements is output from the preceding neighbor sorting unit in the cascade, the SH shift data elements and a subset of the data elements of the sorted array in accordance with the value of SH, in which 1≤SH≤B, and outputting, as SHN shift-next data elements in order, SHN data elements from the sorted array of data elements more or less significant than the most or least significant data element of the sorted array stored in the B registers by the storing, in which 1≤SHN≤B.

In one alternative of the apparatus, when the SH shift data elements is output from the preceding neighbor sorting unit in the cascade, the SH shift data elements may be stored into the B registers of the given sorting unit in sequence starting from a least or most significant register of the B registers, and B-SH data elements from the sorted array, starting from the SH+1 data element of the sorted array, may be stored in the B registers in sequence starting from the register of the B registers neighboring the register of the B registers in which the least or most significant of the shift data elements is stored.

In one alternative of the apparatus, each of the S sorting units may include a load-shift control block and a value selector block, and is associated with an Internal Parallel Sorter (IPS) which is a part of the circuitry, wherein, in each of the S sorting units, the load-shift control block controls the comparison of each of the L data elements with the most significant value of the B registers, when at least one comparison data element is determined from the comparison, the IPS generates the sorted array including each comparison data element determined from the comparison and the data elements of the B registers in the order of significance, and the value selector block selects B data elements for storing into the B registers in sorted order based on a number of data elements input into one or more sorting units of the cascade having one of higher and lower priority.

In one alternative of the apparatus, in the given sorting unit, the sorted array may be generated by the IPS using Batcher's Odd/Even sorting algorithm when L is less than a predetermined value.

In one alternative of the apparatus, in the given sorting unit when L is less than B, an input of the IPS that is unused may be set to a maximum value to be discarded when the value selector block is selecting B data elements for storing into the B registers.

In one alternative of the apparatus, in each of the S sorting units, each comparison data element determined based on the comparison may be less than a maximum value or greater than a minimum value of the B registers for the sorting unit.

In one alternative of the apparatus, in the given sorting unit, when the SH shift data elements is output from the preceding neighboring sorting unit, the subset of the data elements of the sorted array may not include the SH data elements of the sorted array starting in sequence from a first or last data element of the sorted array.

In one alternative of the apparatus, the inputting of the L input data elements may be into each sorting unit of the cascade at the same time.

In accordance with an aspect of the present invention, a device may include a processing device to receive data elements. The processing device may be configured to sort N data elements which are received into M most significant data elements in sorted order, wherein M<N, by controlling: inputting L data elements of the N data elements at a same time into at least one sorting unit of a cascade of S sorting units of the processing device, in which the L input data elements is sorted only among the L input data elements before the inputting, in which the sorting units are arranged in the cascade in order of priority, in which each of the sorting units includes B registers for storing M/S data elements in sorted order and in order in relation to data elements respectively in the B registers of a neighbor sorting unit in the cascade, in which the S sorting units store a current set of most significant data elements of data elements previously input thus far, and in which S*B=M, B≥L and L≥1; for each sorting unit of the cascade, sorting (i) each comparison data element determined to be inserted in the sorting based on a comparison of each of the L input data elements with a most significant value of the B registers of the sorting unit and (ii) the data elements respectively of the B registers of the sorting unit, to obtain a sorted array of data elements in order of significance; and at a given sorting unit of the cascade, storing, into the B registers in sorted order, data elements determined from (i) when no shift data elements is output from a preceding neighbor sorting unit in the cascade, the B most significant values of the sorted array of data elements for the given sorting unit, and (ii) when SH shift data elements is output from the preceding neighbor sorting unit in the cascade, the SH shift data elements and a subset of the data elements of the sorted array in accordance with the value of SH, in which 1≤SH≤B, and outputting, as SHN shift-next data elements in order, SHN data elements from the sorted array of data elements more or less significant than the most or least significant data element of the sorted array stored in the B registers by the storing, in which 1≤SHN≤B.

In one alternative of the device, when the SH shift data elements is output from the preceding neighbor sorting unit in the cascade, the SH shift data elements may be stored into the B registers of the given sorting unit in sequence starting from a least or most significant register of the B registers, and B-SH data elements from the sorted array, starting from the SH+1 data element of the sorted array, may be stored in the B registers in sequence starting from the register of the B registers neighboring the register of the B registers in which the least or most significant of the shift data elements is stored.

In one alternative of the device, each of the S sorting units may include a load-shift control block and a value selector block, and be associated with an Internal Parallel Sorter (IPS) which is a part of the processing device, wherein, in each of the S sorting units, the load-shift control block controls the comparison of each of the L data elements with the most significant value of the B registers, when at least one comparison data element is determined from the comparison, the IPS generates the sorted array including each comparison data element determined from the comparison and the data elements of the B registers in the order of significance, and the value selector block selects B data elements for storing into the B registers in sorted order based on a number of data elements input into one or more sorting units of the cascade having one of higher and lower priority.

In one alternative of the device, in the given sorting unit, when the SH shift data elements is output from the preceding neighboring sorting unit, the subset of the data elements of the sorted array may not include the SH data elements of the sorted array starting in sequence from a first or last data element of the sorted array.

BRIEF DESCRIPTION OF THE DRAWINGS

FIG. 10 illustrates detailed operations of register movement as a function of different insertion scenarios with B=4 and L=4 according to an aspect of the present invention.

DETAILED DESCRIPTION

Figure 1:
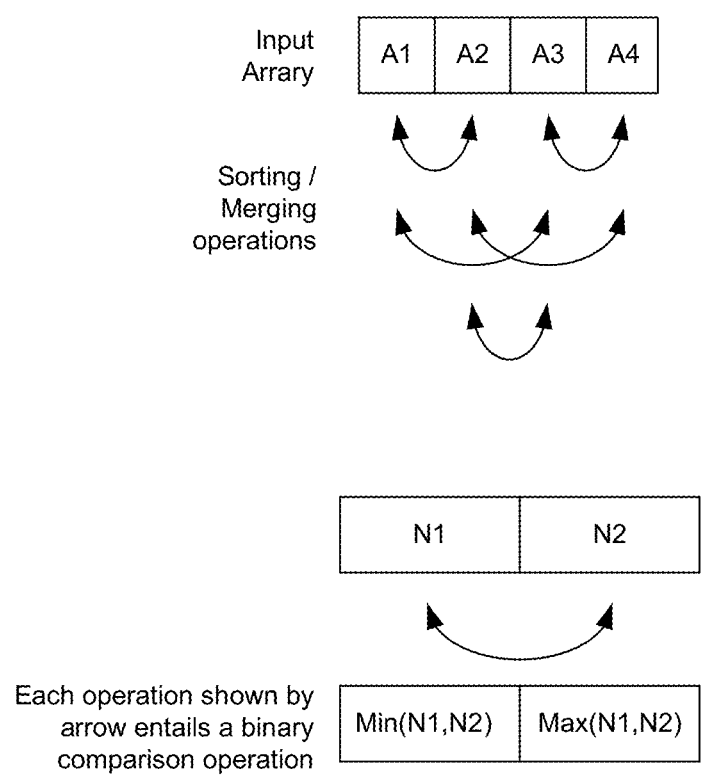
FIG. 1 illustrates the basic operations of Batcher's Odd/even sorting method applied to a set of N=4 elements.
Figure 2:
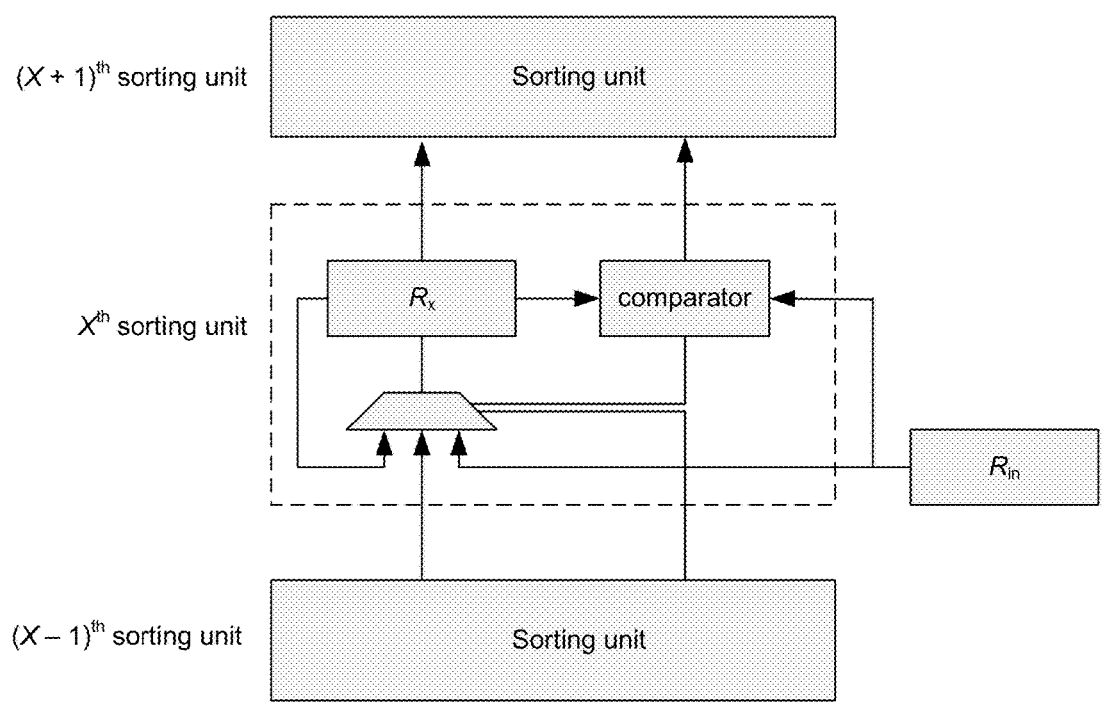
FIG. 2 illustrates one unit of an Insertion sort method.
Figure 3:
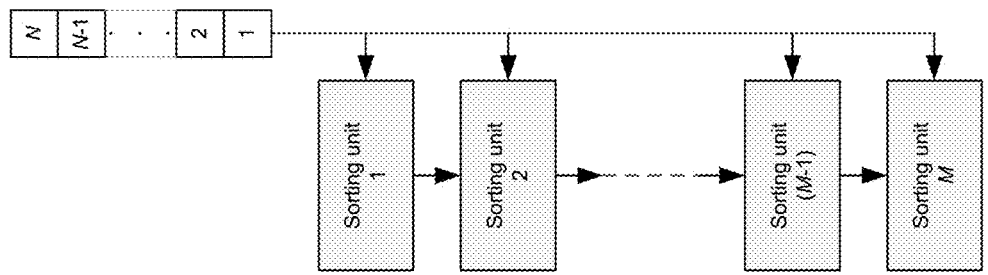
FIG. 3 illustrates a block diagram of streaming Insertion sort logic for selecting M elements.

The foregoing aspects, features and advantages of the present invention will be further appreciated when considered with reference to the following description of exemplary embodiments and accompanying drawings, wherein like reference numerals represent like elements. In describing the exemplary embodiments of the invention illustrated in the appended drawings, specific terminology will be used for the sake of clarity. However, the aspects of the invention are not intended to be limited to the specific terms used.

In many applications, it is required to extract the M smallest or largest elements from a set of N elements. The total number of elements N in a set may be infinite in theory or very large in practice. The number of smallest or largest elements M may be generally much smaller.

The elements to be sorted may be available all at once as a block or may become available one at a time in a serial manner. Other intermediate scenarios where small sets of the elements to be sorted become available at once are also possible. For the description of the present invention, let the number of elements that are input at a time to the sorting apparatus be denoted by L.

Figure 4:
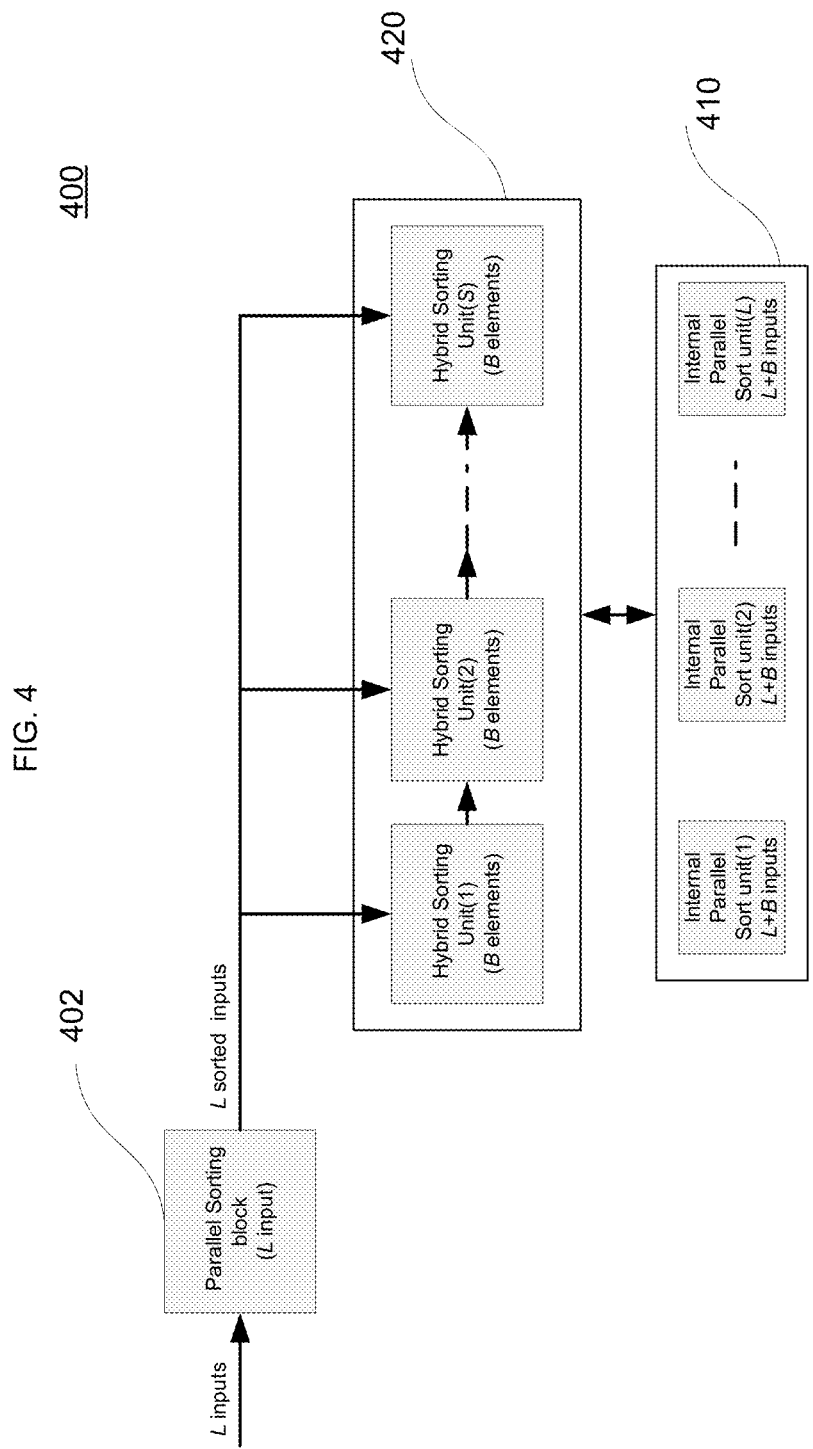
FIG. 4 illustrates a high level block diagram of the high speed streaming sorter according to the aspects of the present invention.

According to an aspect of the present invention, a hybrid streaming sorter 400 based on the combination of several small parallel sorting units 410 and several insertion sort units 420 is disclosed. The block diagram of the high speed streaming sorter according to the aspects of the present invention is shown in FIG. 4. The hybrid streaming sorter is well suited for the case where sorting of a large array of N elements is required with L elements being available at a time and M most significant elements in sorted order are required. According to an aspect of the present invention, the overall hardware complexity and power consumption are reduced compared to a fully parallel sorter while maintaining high speed sorting performance.

According to an aspect of the present invention, the L input elements may be sorted amongst themselves in a parallel sorting block 402 before inserting them into the current set of M most significant elements as shown in FIG. 4. Generally, L may be a small quantity therefore Batcher's Odd/Even sorting algorithm may be used to sort the L new input elements.

Figure 5:
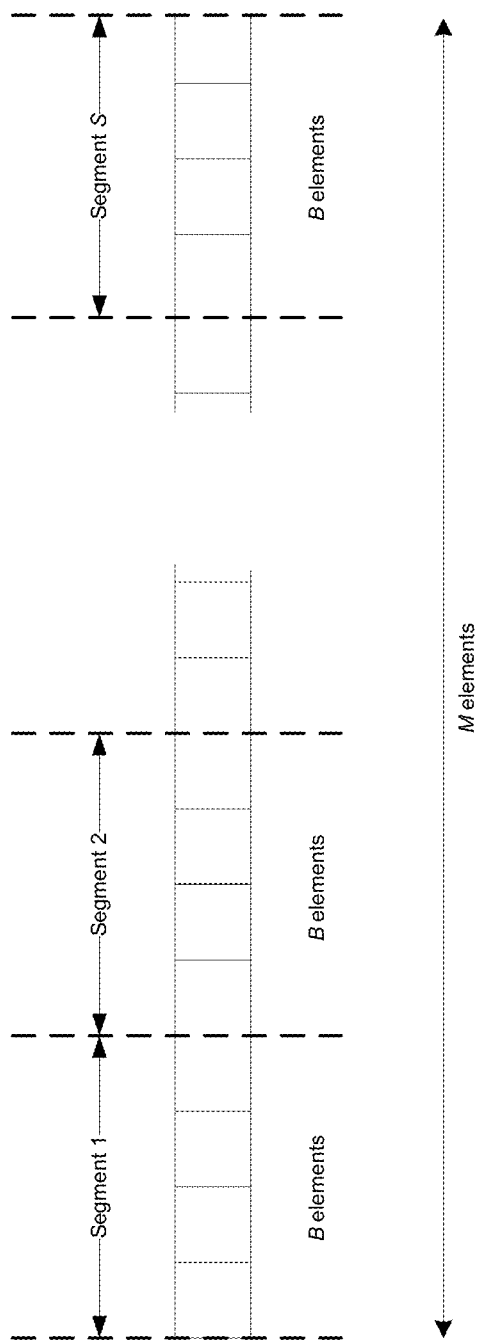
FIG. 5 illustrates grouping of M elements into S Hybrid Sorting Units (HSUs) according to the aspects of the present invention.

According to another aspect of the present invention, the M elements are grouped into disjoint segments such that each segment contains B elements. The value B may be chosen in such a way that B≥L and M is an integral multiple of B. Grouping of M elements into disjoint segments is shown in FIG. 5. The sorting unit that sorts a segment with B elements is referred herein as a Hybrid Sorting Unit (HSU). There are total of S=M/B HSUs where S and B are chosen such that S*B=M. According to an aspect of the present invention, the S HSUs are cascaded to form a streaming sorter. The B elements present in an HSU are always arranged in sorted order.

According to an aspect of the innovation, the hybrid streaming sorter may only require S*L comparisons to be performed per L input values, whereas in a conventional insertion sorting method a total of M*L comparisons may be performed per L input values over L clock cycles. The total number of comparisons performed may be reduced by a factor of B. The choice of B may be flexible, and based on the application the HSU architecture may be modified accordingly.

Figure 6:
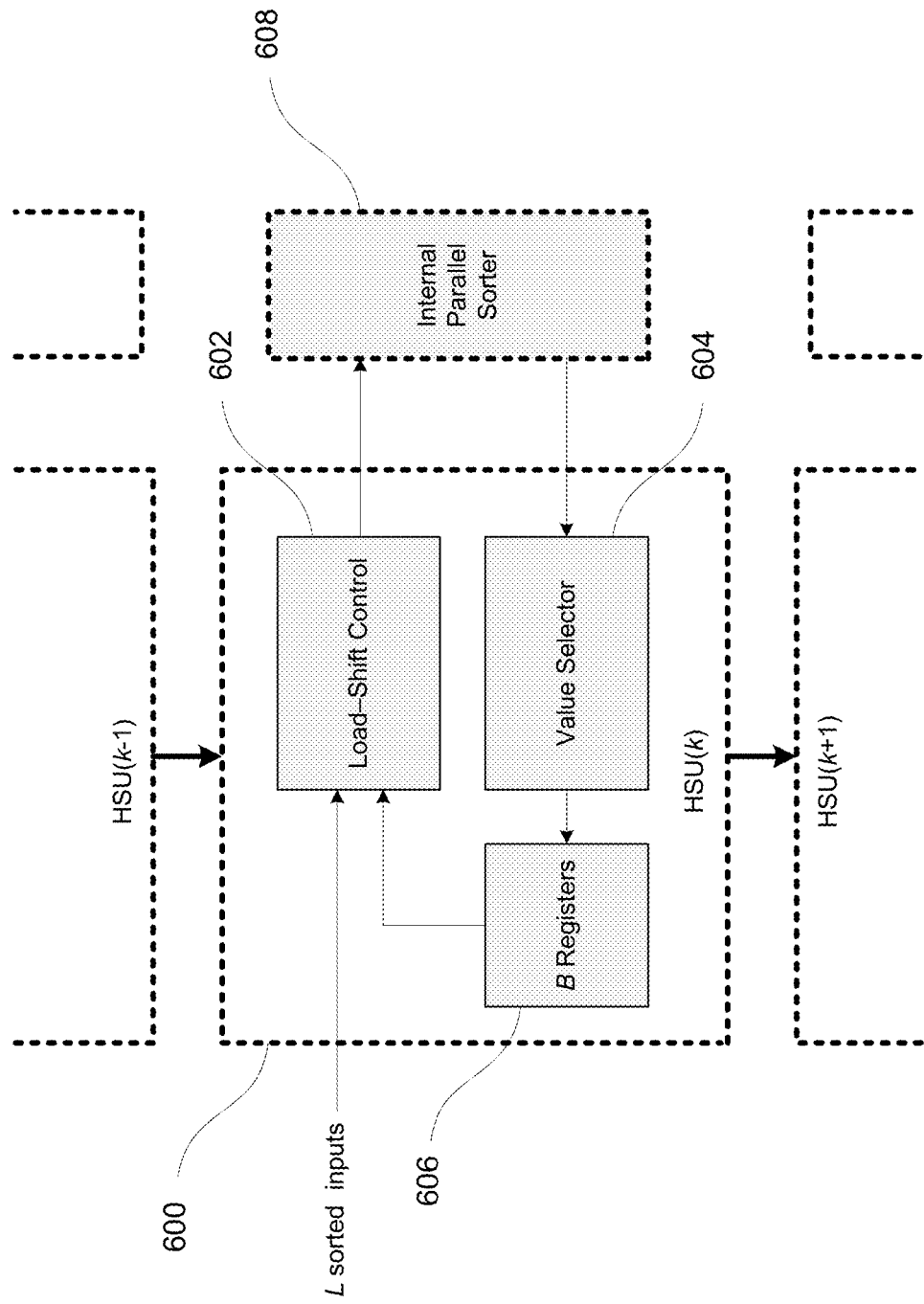
FIG. 6 illustrates a high level block diagram of a Hybrid Sorting Unit according to an aspect of the present invention.

FIG. 6 shows a block diagram of an HSU 600 according to the aspects of the present invention. Each HSU may include a Load-Shift Control block 602, a Value selector block 604, and Registers 606 to hold the B elements. An Internal Parallel Sorter (IPS) 608 may be associated with an HSU if at least one of the L input values needs to be inserted into the HSU. There are S HSUs and L Internal Parallel Sorters. The association of the Internal Parallel Sorters to the HSUs may vary for each new set of L input values. According to the aspects of the present invention, the sorting operation in the HSU may be performed in two steps, Data Insertion and Internal Parallel Sorting.

According to an aspect of the present invention, the Load-Shift Control block 602 compares the L input elements with the maximum value out of the existing B elements in the unit. Based on the resultant comparison metric, Load-Shift Control block 602 determines the following:

i) Number of elements to be inserted into the present HSU.
ii) Number of elements to be moved to next HSU.

According to an aspect of the present invention, the Data Insertion into an HSU occurs based on priority. Data Insertion in HSU(1) gets higher priority than HSU(2), which in turn gets higher priority than HSU(3) and so on until all the HSUs are considered. Hence, the number of elements to be inserted into HSU(k) depends on the number of L input elements inserted in HSU(1) to HSU(k−1) and the comparison metric of HSU(k).

According to an aspect of the present invention, if no Data Insertion takes place inside an HSU, the existing B elements in that HSU remain in sorted order. According to an aspect of the present invention, in case Data Insertion is performed in an HSU, the elements present in all the following HSUs in a pipeline may be shifted in such a way that elements with maximum values are discarded. According to an aspect of the present invention, each of the HSUs has B elements in sorted order as the HSU gets new elements from a partially sorted array except for the elements present in an HSU where Data Insertion takes place.

As an example, suppose two elements are inserted in HSU(k−1). In this case, two maximum valued elements out of the total (B+2) elements are moved from HSU(k−1) to the HSU(k). Now in HSU(k), two maximum valued elements out of (B+2) are shifted to HSU(k+1) and so on. As seen in this example, the IPS may be used to sort the elements of HSU(k−1) to find two maximum elements to be moved to HSU(k). However in HSU(k) and HSU(k+1), new data elements are inserted which were part of partially sorted array. Hence, the B elements of HSU(k) and HSU(k+1) are still in sorted order.

Data Insertion may take place in different ways. For example, all the L input elements may be inserted into a single HSU or each element out of L input elements may be inserted in different HSUs. According to an aspect of the present invention, to handle the worst-case scenario of Data Insertion, L IPSs, which are capable of sorting (L+B) elements at a time, are used as shown in FIG. 4.

According to an aspect of the present invention, the Value Selector block 604 selects the B elements to be stored into the registers of the HSU after Data Insertion and internal parallel sorting operation. The Value Selector selects B elements to be stored in HSU(k) based on the number of inputs inserted in HSU(0) to HSU(k). In FIG. 6, the block 600 corresponds to a single HSU in the set of HSUs shown in block 420 of FIG. 4. Similarly, the block 608 corresponds to a single Internal Parallel Sorter unit in the set of units shown in block 410 of FIG. 4.

To illustrate the interaction of the blocks in FIG. 6, consider an example case of B=4 and L=4 and no shifted inputs from previous higher priority HSUs. Suppose the contents of the B registers in an HSU(k) are [2 4 6 8] and the new set of L sorted inputs is [0 5 9 10]. The Load-Shift Control block 602 compares the L input elements with the maximum value out of the existing B elements in the unit, i.e., the value 8 from the B registers is compared against all the L sorted input values [0 5 9 10]. Based on the resultant comparison metric, Load-Shift Control block 602 determines the following:
  i) Two elements from the L=4 sorted inputs, i.e., [0 5] need to be inserted into the present HSU(k).
  ii) Two elements from B=4 sorted contents of HSU(k) need to be moved to next HSU(k+1).

The Load-Shift Control block 602 provides to the Internal Parallel Sorter 608 the B=4 sorted contents and two new sorted elements to be sorted, i.e., the set [2 4 6 8] and the set [0 5]. The Internal Parallel Sorter 608 operates on these two already sorted arrays and outputs a single sorted array of elements, i.e., [0 2 4 5 6 8] which is input to the Value Selector block 604. The Value Selector block 604 selects the B=4 smallest elements and stores them in the B registers of HSU(k). The Value Selector block 604 shifts the remaining two elements [6 8] out to the next HSU(k+1).

Figure 8:
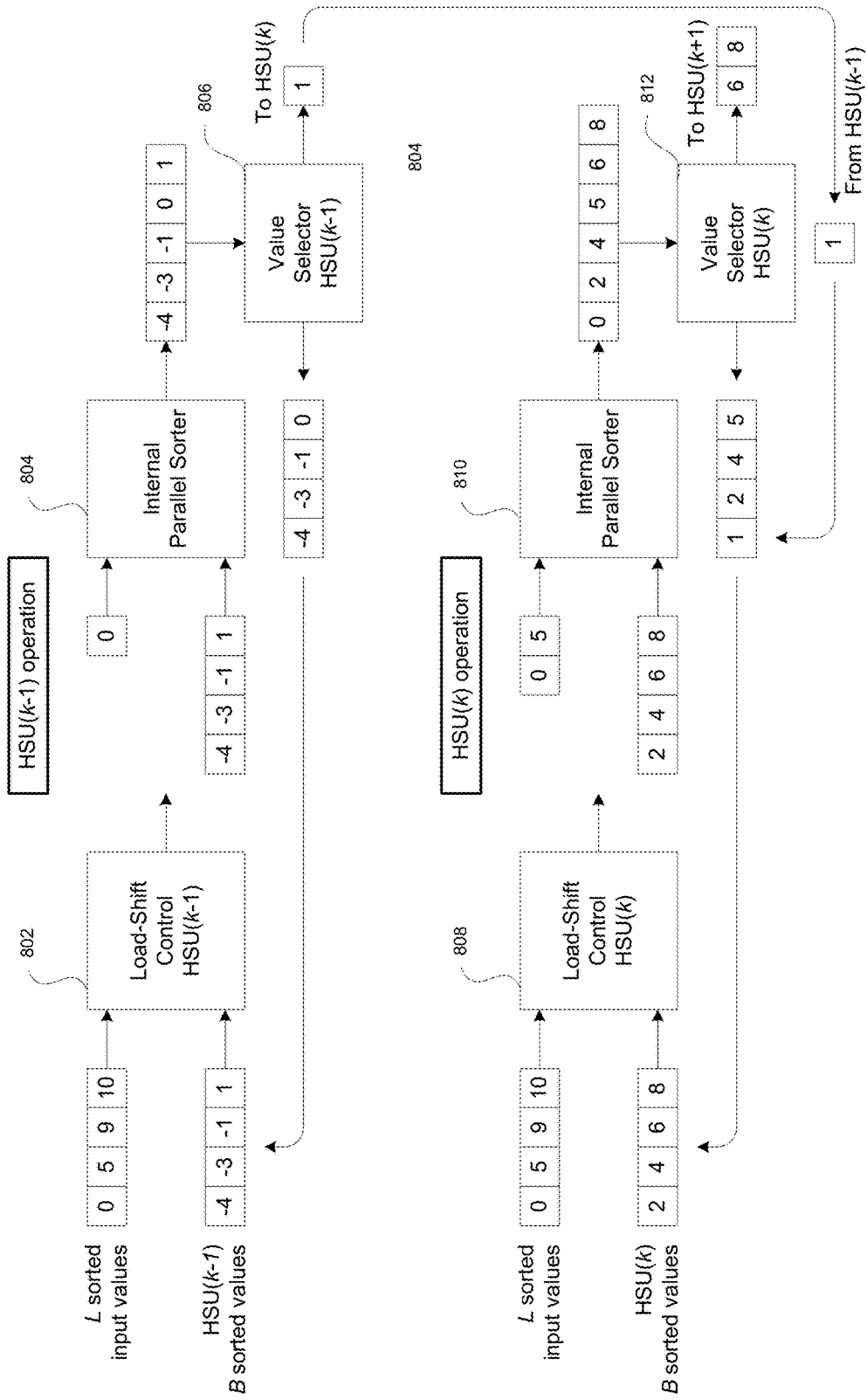
FIG. 8 illustrates an example data insertion and sorting operations for two HSUs with B=4 and L=4 with one of L values inserted in each HSU and one value shifted in from one HSU to the next HSU according to an aspect of the present invention.

To further illustrate the interaction of the blocks in FIG. 6, consider another example case of B=4 and L=4 with one shifted input from previous higher priority stage. Continuing with the values used in the previous example, suppose the contents of the B registers in an HSU(k) are [2 4 6 8], the new set of L sorted inputs is [0 5 9 10] and the contents of the B registers in an HSU(k−1) are [−4 −3 −1 1] as shown in FIG. 8. With these inputs, the Load-Shift Control block 802 in HSU(k−1) determines that one value needs to be inserted in HSU(k−1). It gives the two sets of values [−4 −3 −1 1] and [0] to the Internal Parallel Sorter 804 associated with it. From the sorted output [−4 −3 −1 0 1] of the Internal Parallel Sorter, the B=4 smallest values are selected by the Value Selector block 806 of the HSU(k−1). The remaining value [1] from the sorted array is shifted out to the HSU(k). Note that the values shifted out by HSU(k−1) into the HSU(k) are by definition always smaller than the smallest values in the B registers. The Load-Shift Control block 808 in HSU(k) compares the L sorted inputs [0 5 9 10] with its largest value [8] from the B values [2 4 6 8]. Based on this comparison it determines that two values [0 5] need to be inserted. It provides the two sets of values [2 4 6 8] and [0 5] to the Internal Parallel Sorter 810 associated with it which outputs the sorted array [0 2 4 5 6 8]. Since one value is already inserted in previous stages, the Value Selector block 812 skips the first value and selects the next B−1=3 values to be stored in the B registers of HSU(k). The value [1] shifted in from HSU(k−1) is pre-pended by the Value Selector block 812 to the sorted output of the Internal Parallel Sorter, i.e., the B registers in the HSU(k) have the values [1 2 4 5]. The last two values [6 8] from the Internal Parallel Sorter are then shifted out to the HSU(k+1).

Figure 7:
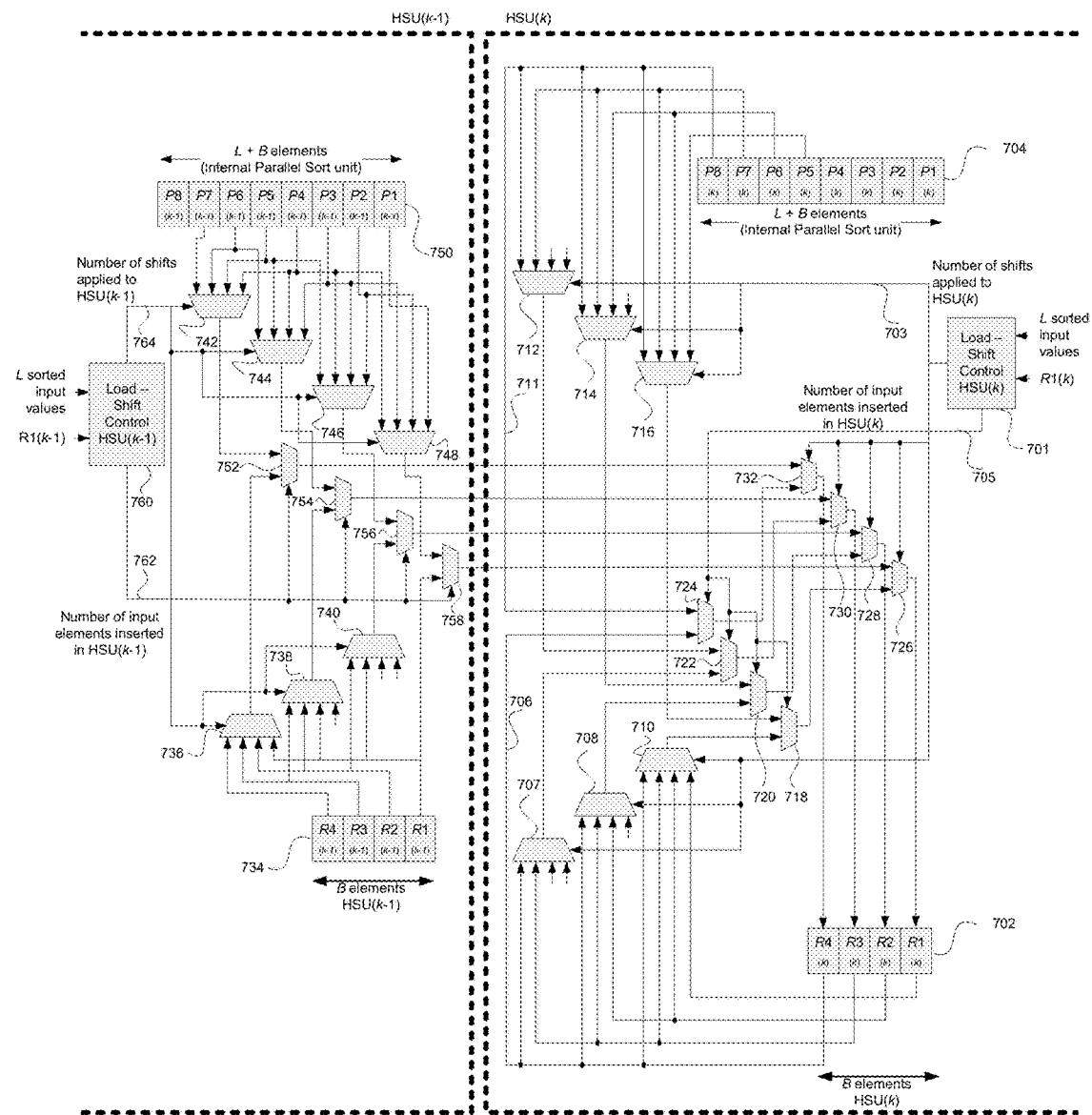
FIG. 7 illustrates a detailed circuit diagram of an HSU with B=4 and L=4 according to an aspect of the present invention.

A further detailed structure for Value selector block 604 of HSU(k) in FIG. 6 of the hybrid streaming sorter for the case of B=4 and L=4 is shown in FIG. 7. The operation of this circuit is described using a general case of sorting where Data Insertion takes place in one or more HSUs up to and including HSU(k).

FIG. 7 shows portions of adjacent HSUs, namely, HSU(k−1) and HSU(k), separated by dashed lines. The HSU(k) includes a block 702 containing the B=4 registers R4(k), R3(k), R2(k) and R1(k) to store the sorted data elements of the segment. This corresponds to block 606 in FIG. 6. At any instant of time, the values in the registers are arranged in ascending order, i.e. $R4(k) \leq R3(k) \leq R2(k) \leq R1(k)$. The Load-Shift Control block 701 in FIG. 7 corresponds to block 602 in FIG. 6 and it contains L comparators (not shown). The L input elements are compared with the register value $R1(k)$ that is the largest value in HSU(k). The Load-Shift Control block 701 determines the number of input elements to be inserted into HSU(k) based on the result of L comparisons and shifted out inputs from HSU(k−1). This determination is output as a signal 705. The Load-Shift Control block 701 also receives the information about number of elements shifted out of the previous stage. This signal is output by the Load-Shift Control block 701 as a signal 703 which is used to select the output from the Internal Parallel Sorter registers 704. The Internal Parallel Sorter registers 704 are in sorted order, i.e., $P8(k) \leq P7(k) \leq \ldots \leq P1(k)$. Based on the signal 705 from the Load-Shift Control block 701, the multiplexers 712, 714 and 716 select the required register values from $P8(k)$, $P7(k)$, $P6(k)$, and $P5(k)$. The lowest value $P8(k)$ is selected without requiring a multiplexer. Similarly, based on the signal 705 from the Load-Shift Control block 701, the multiplexers 707, 708 and 710 select the required register values from $R4(k)$, $R3(k)$, $R2(k)$, and $R1(k)$ from the B registers 702. The lowest value $R4(k)$ is selected without requiring a multiplexer. Next, the selected values from the Internal Parallel Sorter registers 704 and the B register 702 values are further selected by using the multiplexers 718, 720, 722, 724 and the control signal 705 (number of input elements inserted in HSU(k)). Finally, the B values to be stored in the HSU(k) are selected between B values shifted out from the previous HSU(k−1) and the output of the multiplexers 718, 720, 722, and 724 by using the multiplexers 726, 728, 730 and 732. The output of these multiplexers is stored back into the B registers 702 for use during next set of inputs.

Turning to the HSU(k−1) portion of FIG. 7, it determines the elements to be shifted out to the HSU(k). The HSU(k−1) includes a block 734 containing the B=4 registers R4(k−1), R3(k−1), R2(k−1) and R1(k−1) to store the sorted data elements of the segment. The Load-Shift Control block 760 in FIG. 7 contains L comparators (not shown). The L input elements are compared with the register value $R1(k−1)$ that is the largest value in HSU(k−1). The Load-Shift Control block 760 determines the number of input elements to be inserted into HSU(k−1) based on the result of L comparisons and inputs from HSU(k−2). This determination is output as a signal 762. The Load-Shift Control block 760 also receives the information about number of elements shifted out of the previous stage. This signal is output by the Load-Shift Control block 760 as a signal 764 which is used to select the output from the Internal Parallel Sorter registers 750. The Internal Parallel Sorter registers 750 are in sorted order, i.e., $P8(k−1) \ P7(k−1) \leq \ldots \leq P1(k−1)$. Based on the signal 764 from the Load-Shift Control block 760, the multiplexers 742, 744, 746, and 748 select the required register values from $P7(k−1), P6(k−1), \ldots, P1(k−1)$. Similarly, based on the signal 764 from the Load-Shift Control block 760, the multiplexers 736, 738 and 740 select the required register values from $R4(k−1)$, $R3(k−1)$, $R2(k−1)$, and $R1(k−1)$ from the B registers 734. The highest value $R1(k−1)$ is selected without requiring a multiplexer. Next, the selected values from the Internal Parallel Sorter registers 750 and the B register 734 values are further selected by using the multiplexers 752, 754, 756, 758 and the control signal 762 (number of input elements inserted in HSU(k−1)). The output of these multiplexers is shifted out to the HSU(k) along with the number of entries shifted out to it.

The data Insertion step performed within an HSU is based on the case that the B elements present in an HSU are in sorted order. After performing Data Insertion of L input elements into the S HSUs, the elements within each HSU in general may not be in sorted order. Hence, the IPS 608 is used which can sort the elements of an HSU and the new input elements inserted in the same HSU. Batcher's Odd/

Even sorting algorithm may be used to get higher performance with low complexity for the IPS with smaller number elements.

After Data Insertion, there are two arrays, one sorted array with B elements and another one with up to L elements. In case the number of elements inserted in an HSU is less than L, the unused inputs of the Parallel Internal sorter may be set to a maximum value that may be discarded during Value Selector operation. If the array with L elements is in sorted order, then the task of the IPS block 608 reduces to a simple merge operation of two sorted arrays with B elements each (since B≥L, merge operation with larger of the two lengths is considered). In the worst case, merge operation of two arrays with B elements requires (3B−1) comparators, i.e., B comparators for sorting and (2B−1) comparators for merging the results of sort operation.

Figure 9:
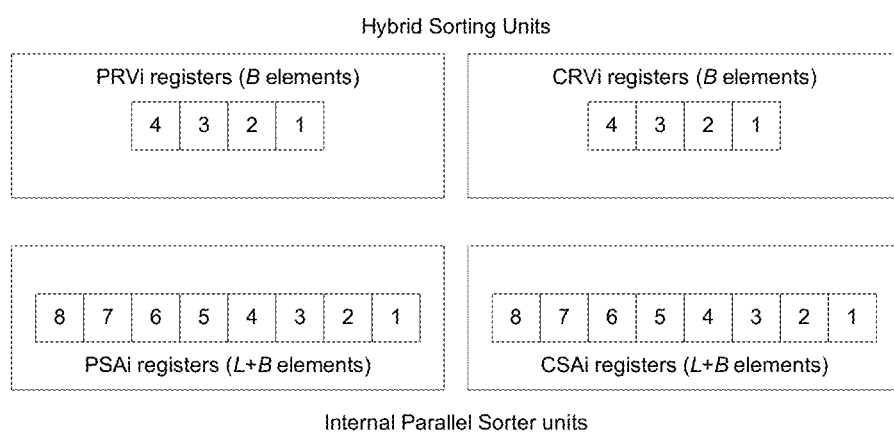
FIG. 9 illustrates register names for two adjacent HSUs and their associated parallel internal sorters with B=4 and L=4 according to an aspect of the present invention.

Each register in an HSU(k) is connected to the other registers of HSU(k), HSU(k−1) and IPS serving HSU(k) and HSU(k−1) through the Value Selector block as shown in FIG. 7. The operation of the HSU is described in more detail for the case of L=4 and B=4. Let the elements of HSU(k−1) be denoted by PRVi (Previous HSU Register Value) where i=1 to B. Similarly, let the elements of HSU(k) be denoted by CRVi (Current HSU Register Value) where i=1 to B. Let the elements of Internal Parallel Sorter used in connection with HSU(k−1) be denoted by PSAi (Previous parallel Sorted Array) where i=1 to L+B. Let the elements of IPS used in connection with HSU(k) be denoted by CSAi (Current parallel Sorted Array) where i=1 to L+B. All the elements involved in the interaction are illustrated in FIG. 9. At any instant of time, the values in the IPS registers are arranged in descending order, i.e. CSA(8)≥CSA(7)≥CSA(6)≥CSA(5)≥CSA(4)≥CSA(3)≥CSA(2)≥CSA(1). The order holds true for the PSA registers as well.

The table contained in FIG. 10 summarizes the operations performed by the Value Selector block of HSU(k) in different scenarios. The first column in the table lists the scenario number. The second column in the table lists some example number of elements shifted into the HSU(k−1) from the higher priority stages up to (k−1). The third column in the table lists some example number of elements that may be inserted in the HSU(k−1). Similarly, the fourth column lists the total number of elements shifted in until the HSU(k), i.e., the sum of second and third columns. The fifth column lists some example number of elements that may be inserted in the HSU(k). The last four columns list the content of the HSU(k) after the shifting and insertion of elements according to the various example scenarios listed. Next few example scenarios are described.

In scenario 1 of the table contained in FIG. 10, there are no elements shifted in from higher priority HSUs and no elements are inserted in the HSU(k). Therefore, the content of the HSU(k) registers remain unchanged.

In scenario 2 of the table contained in FIG. 10, there are no elements shifted in from higher priority HSUs and one element is inserted in the HSU(k). Here the next set of registers for the HSU(k) are selected from the IPS output which sorts the newly inserted element into the existing B=4 elements of the HSU(k). From these sorted registers the smallest four elements are loaded into the HSU(k) as the new B=4 elements.

In scenario 3 of the table contained in FIG. 10, there are no elements shifted in from higher priority HSUs and one element is inserted in the HSU(k−1). Here the HSU(k−1) registers are updated as described in scenario 2 for the HSU(k). The original largest value CRV1 in HSU(k) is shifted out to the HSU(k+1) and the CRV4, CRV3, and CRV2 are shifted to the right to make room for the element shifted out of the HSU(k−1). The element for the next R4 register is selected from the fifth entry PSA5 from the IPS associated with the HSU(k−1).

In scenario 4 of the table contained in FIG. 10, there are no elements shifted in from higher priority HSUs, one element is inserted in the HSU(k−1), and one element is inserted in the HSU(k). Here the HSU(k−1) registers are updated as described in scenario 3. The HSU(k) registers are updated as described in scenario 2. Finally, the fifth largest element, PSA5 from the parallel internal sorter associated with the HSU(k−1) is shifted into the R4 of the HSU(k) and the CSA1, CSA2, and CSA3 are shifted to the right while CSA4 is shifted to the HSU(k+1).

The rest of the scenarios listed in the table contained in FIG. 10 follow similar operations as described in detail for the first four scenarios.

In general, for any register in HSU(k), each register takes a value from the registers of the HSU(k), if number of shifts to be performed in HSU(k) is less than the total number of registers within HSU(k) that has values smaller than the register value under consideration. If number of shifts to be performed in HSU(k) is more than the total number of registers within HSU(k) that has values smaller than the register value under consideration, then the register takes the values from HSU(k−1).

The number of elements in a segment, i.e., value of B, defines the number of HSUs in the system. Total number of data comparisons performed per clock cycle is S*L, i.e., (M/B)*L. Increasing number of elements in a segment reduces the total number of comparisons to be performed. This in turn simplifies the design of the controller used to control the data flow. However, with increase in B, the parallel sorting block complexity increases. This results in increased hardware resources.

The number of inputs considered per iteration i.e., L defines the throughput of the system. When L<<N this architecture provides significant improvement in terms of hardware resources and power consumption. With increase in L, overall comparisons performed in HSUs increase. However, the throughput of the system is also higher. With smaller values of L, the complexity of the method decreases significantly and throughput reduces.

The number of IPS (Merge operations) units required for sorting the intermediate results in each HSU depends on the choice of B and L. When S>L, L IPS units which can sort (L+B) elements at a time are required. The complexity of the IPS units increases with increase in B and L. When S<L, S Parallel Sorting blocks are required and complexity increases with the value of B. In order to operate at higher clock frequencies both B and L are expected to have smaller values in practice. However, to meet the desired complexity and performance tradeoffs, the method presented according to aspects of the invention can be applied to any combination of values of B, L, and S for a given value of M as long as B L.

The parallel sorting algorithms such as Batcher's Odd/Even sort can be used to produce high throughput. However, Batcher's Odd/Even sort algorithm can only be applied to arrays with the number of elements being a power of two, i.e., $2^j$ where j≥2. Hence the value of N should be rounded to the nearest power of 2 such that $2^{j-1}<N\le 2^j$, which results in redundant comparisons. In addition, the number of comparators required for sorting increases rapidly with increase in N. For an increase in N by a factor of two, the logic depth may increase by $2*\log_2(N)$. This may reduce the clock frequency of operation. Introducing pipelining to break the logic depth may decrease the throughput by a factor proportional to the number of pipelining stages introduced. Overall, the complexity and logic depth, clock speed tradeoffs become less practical as the value of N grows.

The disclosed method provides an advantageous tradeoff between complexity, logic depth and the achievable clock speed. Furthermore, the disclosed method offers flexibility to choose B and L that may suit the target application.

To select M elements, the disclosed hybrid streaming sorter requires B times less comparisons in contrast to the number of comparators required for Insertion sort. The number of comparators required in IPS is small for smaller values of B. In addition, the hybrid streaming sorter is L times faster than the Insertion Sort. Hence, the hybrid streaming sorter offers both complexity and power consumption advantages over an Insertion sort. In contrast to the parallel sorting algorithms, the number of comparators required remains the same for a given M, B and L values and does not depend on the value of N, whereas it grows rapidly with increase in N in the former case. For the disclosed hybrid streaming sorter, increase in N does not have any impact on the throughput or operating frequency, whereas in parallel sorting algorithm operating frequency reduces with increase in N.

Aspects of the present invention may be implemented in firmware of a micro-processor or micro-controller. In another alternative, aspects of the present invention may also be implemented as any combination of firmware, software and hardware running on a controller, such as a computer processing unit (CPU) or circuitry. The hardware may be an application specific integrated circuit (ASIC), field programmable gate array (FPGA), discrete logic components or any combination of such devices.

The invention claimed is:

1. A method for sorting, by circuitry, N data elements into M most significant data elements in sorted order, wherein M<N, the method comprising:
controlling, by a processing device, inputting L data elements of the N data elements at a same time into at least one sorting unit of a cascade of S sorting units, in which the L input data elements are sorted by a first comparator circuit of the circuitry only among the L input data elements before the inputting, in which the sorting units are arranged in the cascade in order of priority, in which each of the sorting units includes B registers for storing M/S data elements in sorted order and in order in relation to data elements respectively in the B registers of a neighbor sorting unit in the cascade, in which the S sorting units store a current set of most significant data elements of data elements previously input thus far, and in which S*B=M, B≥L and L≥1;
controlling, by the processing device, for each sorting unit of the cascade, sorting (i) each comparison data element determined to be inserted in the sorting based on a comparison by a second comparison circuit of the circuitry of each of the L input data elements with a most significant value of the B registers of the sorting unit and (ii) by a third comparison circuit of the circuitry the data elements respectively of the B registers of the sorting unit, to obtain a sorted array of data elements in order of significance; and
controlling, by the processing device, at a given sorting unit of the cascade,
storing, into the B registers in sorted order, data elements determined from
(i) when no shift data elements is output from a preceding neighbor sorting unit in the cascade, the B most significant values of the sorted array of data elements for the given sorting unit determined by a fourth comparison circuit of the circuitry, and
(ii) when SH shift data elements is output from the preceding neighbor sorting unit in the cascade, the SH shift data elements and a subset of the data elements of the sorted array determined by a fifth comparison circuit of the circuitry in accordance with the value of SH, in which 1≤SH≤B, and
outputting, as SHN shift-next data elements in order, SHN data elements from the sorted array of data elements more or less significant than the most or least significant data element of the sorted array stored in the B registers by the storing, in which 1≤SHN≤B.

2. The method of claim 1,
wherein, when the SH shift data elements is output from the preceding neighbor sorting unit in the cascade,
the SH shift data elements is stored into the B registers of the given sorting unit in sequence starting from a least or most significant register of the B registers, and
B-SH data elements from the sorted array, starting from the SH+1 data element of the sorted array, is stored in the B registers in sequence starting from the register of the B registers neighboring the register of the B registers in which the least or most significant of the shift data elements is stored.

3. The method of claim 1,
wherein each of the S sorting units includes a load-shift control block and a value selector block as a part of the processing device, and is associated with an Internal Parallel Sorter (IPS) which is a part of the processing device,
wherein, in each of the S sorting units,
the load-shift control block controls the comparison of each of the L data elements with the most significant value of the B registers,
when at least one comparison data element is determined from the comparison, the IPS generates the sorted array including each comparison data element determined from the comparison and the data elements of the B registers in the order of significance, and
the value selector block selects B data elements for storing into the B registers in sorted order based on a number of data elements input into one or more sorting units of the cascade having one of higher and lower priority.

4. The method of claim 3, wherein, in the given sorting unit, the sorted array is generated by the IPS using Batcher's Odd/Even sorting algorithm when L is less than a predetermined value.

5. The method of claim 3, wherein, in the given sorting unit when L is less than B, an input of the IPS that is unused is set to a maximum value to be discarded when the value selector block is selecting B data elements for storing into the B registers.

6. The method of claim 1, wherein, in each of the S sorting units, each comparison data element determined based on the comparison is less than a maximum value or greater than a minimum value of the B registers for the sorting unit.

7. The method of claim 1, wherein, in the given sorting unit, when the SH shift data elements is output from the preceding neighboring sorting unit, the subset of the data elements of the sorted array does not include the SH data elements of the sorted array starting in sequence from a first or last data element of the sorted array.

8. The method of claim 1, wherein the inputting of the L input data elements is into each sorting unit of the cascade at the same time.

9. An apparatus for sorting N data elements into M most significant data elements in sorted order, wherein M<N, the apparatus comprising:
  circuitry configured to control:
    inputting L data elements of the N data elements at a same time into at least one sorting unit of a cascade of S sorting units of the circuitry, in which the L input data elements are sorted by a first comparator circuit of the circuitry only among the L input data elements before the inputting, in which the sorting units are arranged in the cascade in order of priority, in which each of the sorting units includes B registers for storing M/S data elements in sorted order and in order in relation to data elements respectively in the B registers of a neighbor sorting unit in the cascade, in which the S sorting units store a current set of most significant data elements of data elements previously input thus far, and in which S*B=M, B≥L and L≥1;
    for each sorting unit of the cascade, sorting (i) each comparison data element determined to be inserted in the sorting based on a comparison by a second comparison circuit of the circuitry of each of the L input data elements with a most significant value of the B registers of the sorting unit and (ii) by a third comparison circuit of the circuitry the data elements respectively of the B registers of the sorting unit, to obtain a sorted array of data elements in order of significance; and
    at a given sorting unit of the cascade,
      storing, into the B registers in sorted order, data elements determined from
        (i) when no shift data elements is output from a preceding neighbor sorting unit in the cascade, the B most significant values of the sorted array of data elements for the given sorting unit determined by a fourth comparison circuit of the circuitry, and
        (ii) when SH shift data elements is output from the preceding neighbor sorting unit in the cascade, the SH shift data elements and a subset of the data elements of the sorted array determined by a fifth comparison circuit of the circuitry in accordance with the value of SH, in which 1≤SH≤B, and
      outputting, as SHN shift-next data elements in order, SHN data elements from the sorted array of data elements more or less significant than the most or least significant data element of the sorted array stored in the B registers by the storing, in which 1≤SHN≤B.

10. The apparatus of claim 9,
  wherein, when the SH shift data elements is output from the preceding neighbor sorting unit in the cascade,
    the SH shift data elements is stored into the B registers of the given sorting unit in sequence starting from a least or most significant register of the B registers, and
    B-SH data elements from the sorted array, starting from the SH+1 data element of the sorted array, is stored in the B registers in sequence starting from the register of the B registers neighboring the register of the B registers in which the least or most significant of the shift data elements is stored.

11. The apparatus of claim 9,
  wherein each of the S sorting units includes a load-shift control block and a value selector block, and is associated with an Internal Parallel Sorter (IPS) which is a part of the circuitry,
  wherein, in each of the S sorting units,
    the load-shift control block controls the comparison of each of the L data elements with the most significant value of the B registers,
    when at least one comparison data element is determined from the comparison, the IPS generates the sorted array including each comparison data element determined from the comparison and the data elements of the B registers in the order of significance, and
    the value selector block selects B data elements for storing into the B registers in sorted order based on a number of data elements input into one or more sorting units of the cascade having one of higher and lower priority.

12. The apparatus of claim 11, wherein, in the given sorting unit, the sorted array is generated by the IPS using Batcher's Odd/Even sorting algorithm when L is less than a predetermined value.

13. The apparatus of claim 11, wherein, in the given sorting unit when L is less than B, an input of the IPS that is unused is set to a maximum value to be discarded when the value selector block is selecting B data elements for storing into the B registers.

14. The apparatus of claim 9, wherein, in each of the S sorting units, each comparison data element determined based on the comparison is less than a maximum value or greater than a minimum value of the B registers for the sorting unit.

15. The apparatus of claim 9, wherein, in the given sorting unit, when the SH shift data elements is output from the preceding neighboring sorting unit, the subset of the data elements of the sorted array does not include the SH data elements of the sorted array starting in sequence from a first or last data element of the sorted array.

16. The apparatus of claim 9, wherein the inputting of the L input data elements is into each sorting unit of the cascade at the same time.

17. A device comprising:
  a processing device to receive data elements,
  wherein the processing device includes circuitry is-configured to sort N data elements which are received into M most significant data elements in sorted order, wherein M<N, by controlling:
    inputting L data elements of the N data elements at a same time into at least one sorting unit of a cascade of S sorting units of the processing device, in which the L input data elements are sorted by a first comparator circuit of the circuitry only among the L input data elements before the inputting, in which the sorting units are arranged in the cascade in order of priority, in which each of the sorting units includes B registers for storing M/S data elements in sorted order and in order in relation to data elements respectively in the B registers of a neighbor sorting unit in the cascade, in which the S sorting units store a current set of most significant data elements of data elements previously input thus far, and in which S*B=M, B≥L and L≥1;

for each sorting unit of the cascade, sorting (i) each comparison data element determined to be inserted in the sorting based on a comparison by a second comparison circuit of the circuitry of each of the L input data elements with a most significant value of the B registers of the sorting unit and (ii) by a third comparison circuit of the circuitry the data elements respectively of the B registers of the sorting unit, to obtain a sorted array of data elements in order of significance; and at a given sorting unit of the cascade,
storing, into the B registers in sorted order, data elements determined from
(i) when no shift data elements is output from a preceding neighbor sorting unit in the cascade, the B most significant values of the sorted array of data elements for the given sorting unit determined by a fourth comparison circuit of the circuitry, and
(ii) when SH shift data elements is output from the preceding neighbor sorting unit in the cascade, the SH shift data elements and a subset of the data elements of the sorted array determined by a fifth comparison circuit of the circuitry in accordance with the value of SH, in which 1≤SH≤B, and
outputting, as SHN shift-next data elements in order, SHN data elements from the sorted array of data elements more or less significant than the most or least significant data element of the sorted array stored in the B registers by the storing, in which 1≤SHN≤B.

18. The device of claim 17,
wherein, when the SH shift data elements is output from the preceding neighbor sorting unit in the cascade, the SH shift data elements is stored into the B registers of the given sorting unit in sequence starting from a least or most significant register of the B registers, and B-SH data elements from the sorted array, starting from the SH+1 data element of the sorted array, is stored in the B registers in sequence starting from the register of the B registers neighboring the register of the B registers in which the least or most significant of the shift data elements is stored.

19. The device of claim 17,
wherein each of the S sorting units includes a load-shift control block and a value selector block, and is associated with an Internal Parallel Sorter (IPS) which is a part of the processing device,
wherein, in each of the S sorting units,
the load-shift control block controls the comparison of each of the L data elements with the most significant value of the B registers,
when at least one comparison data element is determined from the comparison, the IPS generates the sorted array including each comparison data element determined from the comparison and the data elements of the B registers in the order of significance, and
the value selector block selects B data elements for storing into the B registers in sorted order based on a number of data elements input into one or more sorting units of the cascade having one of higher and lower priority.

20. The device of claim 17,
wherein, in the given sorting unit, when the SH shift data elements is output from the preceding neighboring sorting unit, the subset of the data elements of the sorted array does not include the SH data elements of the sorted array starting in sequence from a first or last data element of the sorted array.

* * * * *